US012400667B2

(12) United States Patent
Pihlajakuja et al.

(10) Patent No.: US 12,400,667 B2
(45) Date of Patent: Aug. 26, 2025

(54) SPATIAL AUDIO PARAMETER ENCODING AND ASSOCIATED DECODING

(71) Applicant: Nokia Technologies Oy, Espoo (FI)

(72) Inventors: Tapani Johannes Pihlajakuja, Kellokoski (FI); Adriana Vasilache, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 283 days.

(21) Appl. No.: 17/998,866

(22) PCT Filed: Apr. 15, 2021

(86) PCT No.: PCT/FI2021/050273
§ 371 (c)(1),
(2) Date: Nov. 15, 2022

(87) PCT Pub. No.: WO2021/250311
PCT Pub. Date: Dec. 16, 2021

(65) Prior Publication Data
US 2023/0197087 A1 Jun. 22, 2023

(30) Foreign Application Priority Data
Jun. 9, 2020 (GB) ...................................... 2008735

(51) Int. Cl.
*G10L 19/008* (2013.01)
*G10L 19/00* (2013.01)
(Continued)

(52) U.S. Cl.
CPC .......... *G10L 19/008* (2013.01); *G10L 19/032* (2013.01); *G10L 25/21* (2013.01); *G10L 2019/0004* (2013.01); *G10L 19/002* (2013.01)

(58) Field of Classification Search
CPC ...... G10L 19/032; G10L 25/21; G10L 19/002
See application file for complete search history.

(56) References Cited

U.S. PATENT DOCUMENTS 6,542,863 B1 * 4/2003 Surucu .................... H03M 7/42 704/229
8,462,716 B1 * 6/2013 Li .......................... H04B 7/065 370/465
(Continued)

FOREIGN PATENT DOCUMENTS

GB 2577698 A 4/2020
WO 2006/111294 A1 10/2006
(Continued)

OTHER PUBLICATIONS

"Description of the IVAS MASA C Reference Software", 3GPP TSG-SA4#106 meeting, S4-191167, Agenda: 7.5, Nokia Corporation, Oct. 21-25, 2019, pp. 1-16.
(Continued)

*Primary Examiner* — Daniel C Washburn
*Assistant Examiner* — Paul J. Mueller
(74) *Attorney, Agent, or Firm* — ALSTON & BIRD LLP

(57) ABSTRACT

An apparatus comprising means configured to: obtain at least one direction parameter value for a time-frequency part of at least one audio signal (301); obtain at least one energy ratio for the time-frequency part (301), wherein each energy ratio is associated with a respective direction parameter value; generate respective at least one modified energy ratio from the at least one energy ratio for the time-frequency part (304); determine a quantization spatial resolution for encoding the at least one obtained direction parameter value based on the at least one modified energy ratio (305); and encode the obtained direction parameter values based on the quantization spatial resolution (306).

8 Claims, 8 Drawing Sheets

(51) Int. Cl.

| | |
|---|---|
| ***G10L 19/002*** | (2013.01) |
| ***G10L 19/032*** | (2013.01) |
| ***G10L 25/21*** | (2013.01) |

(56) References Cited

U.S. PATENT DOCUMENTS

| | | | | |
|---|---|---|---|---|
| 9,263,050 | B2 | 2/2016 | Daniel et al. | |
| 11,030,530 | B2 * | 6/2021 | Frinken | G06N 3/044 |
| 2013/0254191 | A1 * | 9/2013 | He | G06F 16/583<br>707/728 |
| 2015/0149166 | A1 * | 5/2015 | Jang | G10L 25/78<br>704/233 |
| 2015/0221313 | A1 * | 8/2015 | Purnhagen | G10L 19/0208<br>704/500 |
| 2019/0132674 | A1 * | 5/2019 | Vilkamo | G10L 25/18 |

FOREIGN PATENT DOCUMENTS

| | | | |
|---|---|---|---|
| WO | 2018/091776 | A1 | 5/2018 |
| WO | 2019/086757 | A1 | 5/2019 |
| WO | 2019/097018 | A1 | 5/2019 |
| WO | 2019/234290 | A1 | 12/2019 |
| WO | 2020/008105 | A1 | 1/2020 |
| WO | 2020/016479 | A1 | 1/2020 |
| WO | 2020/089510 | A1 | 5/2020 |
| WO | 2020/193865 | A1 | 10/2020 |
| WO | 2021/048468 | A1 | 3/2021 |
| WO | 2021/130405 | A1 | 7/2021 |

OTHER PUBLICATIONS

"Proposal for MASA common metadata and metadata structure", 3GPP TSG-SA4#101 meeting, S4-181353, Agenda: 7.5, Nokia Corporation, Nov. 19-23, 2018, pp. 1-4.

Search Report received for corresponding United Kingdom Patent Application No. 2008735.9, dated Dec. 4, 2020, 3 pages.

International Search Report and Written Opinion received for corresponding Patent Cooperation Treaty Application No. PCT/FI2021/050273, dated Aug. 11, 2021, 18 pages.

Li et al., "The Perceptual Lossless Quantization of Spatial Parameter for 3D Audio Signals", International Conference on Multimedia Modeling, 2017, pp. 381-392.

Office action received for corresponding Indian Patent Application No. 202347000399, dated Feb. 21, 2023, 5 pages.

Extended European Search Report received for corresponding European Patent Application No. 21821369.2, dated Mar. 5, 2024, 10 pages.

Office Action for European Application No. 21821369.2 dated May 26, 2025, 5 pages.

* cited by examiner

SPATIAL AUDIO PARAMETER ENCODING AND ASSOCIATED DECODING

RELATED APPLICATION

This application claims priority to PCT Application No. PCT/FI2021/050273, filed on Apr. 15, 2021, which claims priority to GB Application No. 2008735.9, filed on Jun. 9, 2020, each of which is incorporated herein by reference in its entirety.

FIELD

The present application relates to apparatus and methods for sound-field related parameter encoding, but not exclusively for time-frequency domain direction related parameter encoding for an audio encoder and decoder.

BACKGROUND

Parametric spatial audio processing is a field of audio signal processing where the spatial aspect of the sound is described using a set of parameters. For example, in parametric spatial audio capture from microphone arrays, it is a typical and an effective choice to estimate from the microphone array signals a set of directional metadata parameters such as directions of the sound in frequency bands, and the ratios between the directional and non-directional parts of the captured sound in frequency bands. These parameters are known to well describe the perceptual spatial properties of the captured sound at the position of the microphone array. These parameters can be utilized in synthesis of the spatial sound accordingly, for headphones binaurally, for loudspeakers, or to other formats, such as Ambisonics.

The directional metadata such as directions and direct-to-total energy ratios in frequency bands are thus a parameterization that is particularly effective for spatial audio capture.

A directional metadata parameter set consisting of one or more direction value for each frequency band and an energy ratio parameter associated with each direction value can be also utilized as spatial metadata (which may also include other parameters such as spread coherence, number of directions, distance, etc.) for an audio codec. The directional metadata parameter set may also comprise other parameters or may be associated with other parameters which are considered to be non-directional (such as surround coherence, diffuse-to-total energy ratio, remainder-to-total energy ratio). For example, these parameters can be estimated from microphone-array captured audio signals, and for example a stereo signal can be generated from the microphone array signals to be conveyed with the spatial metadata.

As some codecs are expected to operate at various bit rates ranging from very low bit rates to relatively high bit rates, various strategies are needed for the compression of the spatial metadata to optimize the codec performance for each operating point. The raw bitrate of the encoded parameters (metadata) is relatively high, so especially at lower bitrates it is expected that only the most important parts of the metadata can be conveyed from the encoder to the decoder.

A decoder can decode the audio signals into PCM signals and process the sound in frequency bands (using the spatial metadata) to obtain the spatial output, for example a binaural output.

The aforementioned solution is particularly suitable for encoding captured spatial sound from microphone arrays (e.g., in mobile phones, video cameras, VR cameras, standalone microphone arrays). However, it may be desirable for such an encoder to have also other input types than microphone-array captured signals, for example, loudspeaker signals, audio object signals, or Ambisonics signals.

SUMMARY

There is provided according to a first aspect an apparatus comprising means configured to: obtain at least one direction parameter value for a time-frequency part of at least one audio signal; obtain at least one energy ratio for the time-frequency part, wherein each energy ratio is associated with a respective direction parameter value; generate respective at least one modified energy ratio from the at least one energy ratio for the time-frequency part; determine a quantization spatial resolution for encoding the at least one obtained direction parameter value based on the at least one modified energy ratio; and encode the obtained direction parameter values based on the quantization spatial resolution.

The at least one energy ratio for the time-frequency part may comprise at least two direct-to-total energy ratios and a diffuse-to-total energy ratio for the time-frequency part and the means configured to generate respective at least one modified energy ratio from the at least one energy ratio for the time-frequency part may be configured to: determine a largest at the at least two direct-to-total energy ratios; modify the largest of the at least two direct-to-total energy ratios to be an additive inverse of the diffuse-to-total energy ratio; and modify others of the at least two direct-to-total energy ratios to be divided by the largest of the at least two direct-to-total energy ratios and multiplied by the additive inverse of the diffuse-to-total energy ratio.

The at least one energy ratio for the time-frequency part may comprise at least two direct-to-total energy ratios and the means configured to generate respective at least one modified energy ratio from the at least one energy ratio for the time-frequency part may be configured to: generate a combined ratio value from the at least two direct-to-total energy ratios, and switch the combined ratio value for the largest at the at least two direct-to-total energy ratios; and modify each of others of the at least two direct-to-total energy ratios as the direct-to-total energy ratio divided by the largest of the at least two direct-to-total energy ratios and multiplied by the combined energy ratio.

The means configured to generate respective at least one modified energy ratio from the at least one energy ratio for the time-frequency part may be configured to generate a modified direct-to-total energy ratio for each of the direct-to-total energy ratios based on a difference for each of the direct-to-total energy ratios and the respective modified direct-to-total energy ratios.

The at least one energy ratio may be a quantized energy ratio.

The means configured to obtain at least one energy ratio for the time-frequency part, wherein each energy ratio is associated with a respective direction parameter value may be configured to: analyse the at least one audio signal to obtain at least two direct-to-total unquantized energy ratios for the time-frequency part; and quantize the at least two direct-to-total unquantized energy ratios for the time-frequency part to generate at least two direct-to-total quantized energy ratios.

The means configured to quantize the at least two direct-to-total unquantized energy ratios for the time-frequency part to generate at least two direct-to-total quantized energy ratios may be configured to: quantize a first of the at least two direct-to-total unquantized energy ratios for the time-frequency part with a first codebook; quantize a second of the at least two direct-to-total unquantized energy ratios for the time-frequency part with a second codebook, wherein the first codebook and the second codebook are one of: a same resolution such that encoding of the second of the at least two direct-to-total unquantized energy ratios require fewer bits to encode than the first of the at least two direct-to-total unquantized energy ratios; and a different resolution such that encoding of the second of the at least two direct-to-total unquantized energy ratios is encoded with a greater resolution than the first of the at least two direct-to-total unquantized energy ratios.

The means configured to quantize the at least two direct-to-total unquantized energy ratios for the time-frequency part to generate at least two direct-to-total quantized energy ratios may be configured to: quantize a first of the at least two direct-to-total unquantized energy ratios for the time-frequency part with a first codebook; quantize a second of the at least two direct-to-total unquantized energy ratios for the time-frequency part with a second codebook, wherein quantizing the second of the at least two direct-to-total unquantized energy ratios for the time-frequency part a codeword from the second codebook is chosen such that in addition to minimizing the distance to the second of the at least two direct-to-total unquantized energy ratios a ratio between the quantized first of the at least two direct-to-total unquantized energy ratios and quantized second of the at least two direct-to-total unquantized energy ratios is as close as possible to a ratio between the first of the at least two direct-to-total unquantized energy ratios and the second of the at least two direct-to-total unquantized energy ratios.

The means configured to generate respective the at least one modified energy ratio from the at least one energy ratio for the time-frequency part may be configured to constrain the modification of the at least one modified energy ratio based on at least one of: a bit usage for the encoding of the direction parameter values; and an accuracy of the encoding of the direction parameter values.

According to a second aspect there is provided an apparatus comprising means configured to: obtain at least one encoded bitstream comprising: at least one direction parameter value for a time-frequency part of at least one audio signal; at least one energy ratio for the time-frequency part, wherein each energy ratio is associated with a respective direction parameter value; decode the at least one energy ratio for the time-frequency part; generate respective at least one modified energy ratio from the at least one energy ratio for the time-frequency part; determine a quantization spatial resolution for decoding the at least one obtained direction parameter value based on the at least one modified energy ratio; and decode the obtained direction parameter values based on the quantization spatial resolution.

The at least one energy ratio for the time-frequency part may comprise at least two direct-to-total energy ratios and a diffuse-to-total energy ratio for the time-frequency part and the means configured to generate respective at least one modified energy ratio from the at least one energy ratio for the time-frequency part may be configured to: determine a largest at the at least two direct-to-total energy ratios; modify the largest of the at least two direct-to-total energy ratios to be an additive inverse of the diffuse-to-total energy ratio; and modify others of the at least two direct-to-total energy ratios to be divided by the largest of the at least two direct-to-total energy ratios and multiplied by the additive inverse of the diffuse-to-total energy ratio.

The at least one energy ratio for the time-frequency part may comprise at least two direct-to-total energy ratios and the means configured to generate respective at least one modified energy ratio from the at least one energy ratio for the time-frequency part may be configured to: generate a combined ratio value from the at least two direct-to-total energy ratios, and switch the combined ratio value for the largest at the at least two direct-to-total energy ratios; modify each of others of the at least two direct-to-total energy ratios as the direct-to-total energy ratio divided by the largest of the at least two direct-to-total energy ratios and multiplied by the combined energy ratio.

The means configured to generate respective at least one modified energy ratio from the at least one energy ratio for the time-frequency part may be configured to generate a modified direct-to-total energy ratio for each of the direct-to-total energy ratios based on a difference for each of the direct-to-total energy ratios and the respective modified direct-to-total energy ratios.

The at least one energy ratio may be a quantized energy ratio.

According to a third aspect there is provided a method comprising: obtaining at least one direction parameter value for a time-frequency part of at least one audio signal; obtaining at least one energy ratio for the time-frequency part, wherein each energy ratio is associated with a respective direction parameter value; generating respective at least one modified energy ratio from the at least one energy ratio for the time-frequency part; determining a quantization spatial resolution for encoding the at least one obtained direction parameter value based on the at least one modified energy ratio; and encoding the obtained direction parameter values based on the quantization spatial resolution.

The at least one energy ratio for the time-frequency part may comprise at least two direct-to-total energy ratios and a diffuse-to-total energy ratio for the time-frequency part and generating respective at least one modified energy ratio from the at least one energy ratio for the time-frequency part may comprise: determining a largest at the at least two direct-to-total energy ratios; modifying the largest of the at least two direct-to-total energy ratios to be an additive inverse of the diffuse-to-total energy ratio; and modifying others of the at least two direct-to-total energy ratios to be divided by the largest of the at least two direct-to-total energy ratios and multiplied by the additive inverse of the diffuse-to-total energy ratio.

The at least one energy ratio for the time-frequency part may comprise at least two direct-to-total energy ratios and generating respective at least one modified energy ratio from the at least one energy ratio for the time-frequency part may comprise: generating a combined ratio value from the at least two direct-to-total energy ratios, and switching the combined ratio value for the largest at the at least two direct-to-total energy ratios; and modifying each of others of the at least two direct-to-total energy ratios as the direct-to-total energy ratio divided by the largest of the at least two direct-to-total energy ratios and multiplied by the combined energy ratio.

Generating respective at least one modified energy ratio from the at least one energy ratio for the time-frequency part may comprise generating a modified direct-to-total energy ratio for each of the direct-to-total energy ratios based on a difference for each of the direct-to-total energy ratios and the respective modified direct-to-total energy ratios.

The at least one energy ratio may be a quantized energy ratio.

Obtaining at least one energy ratio for the time-frequency part, wherein each energy ratio is associated with a respective direction parameter value may comprise: analysing the at least one audio signal to obtain at least two direct-to-total unquantized energy ratios for the time-frequency part; and quantizing the at least two direct-to-total unquantized energy ratios for the time-frequency part to generate at least two direct-to-total quantized energy ratios.

Quantizing the at least two direct-to-total unquantized energy ratios for the time-frequency part to generate at least two direct-to-total quantized energy ratios may comprise: quantize a first of the at least two direct-to-total unquantized energy ratios for the time-frequency part with a first codebook; quantize a second of the at least two direct-to-total unquantized energy ratios for the time-frequency part with a second codebook, wherein the first codebook and the second codebook are one of: a same resolution such that encoding of the second of the at least two direct-to-total unquantized energy ratios require fewer bits to encode than the first of the at least two direct-to-total unquantized energy ratios; and a different resolution such that encoding of the second of the at least two direct-to-total unquantized energy ratios is encoded with a greater resolution than the first of the at least two direct-to-total unquantized energy ratios.

Quantizing the at least two direct-to-total unquantized energy ratios for the time-frequency part to generate at least two direct-to-total quantized energy ratios may comprise: quantizing a first of the at least two direct-to-total unquantized energy ratios for the time-frequency part with a first codebook; quantizing a second of the at least two direct-to-total unquantized energy ratios for the time-frequency part with a second codebook, wherein quantizing the second of the at least two direct-to-total unquantized energy ratios for the time-frequency part a codeword from the second codebook is chosen such that in addition to minimizing the distance to the second of the at least two direct-to-total unquantized energy ratios a ratio between the quantized first of the at least two direct-to-total unquantized energy ratios and quantized second of the at least two direct-to-total unquantized energy ratios is as close as possible to a ratio between the first of the at least two direct-to-total unquantized energy ratios and the second of the at least two direct-to-total unquantized energy ratios.

Generating respective the at least one modified energy ratio from the at least one energy ratio for the time-frequency part may comprise constraining the modification of the at least one modified energy ratio based on at least one of: a bit usage for the encoding of the direction parameter values; and an accuracy of the encoding of the direction parameter values.

According to a fourth aspect there is provided a method comprising: obtaining at least one encoded bitstream comprising: at least one direction parameter value for a time-frequency part of at least one audio signal; at least one energy ratio for the time-frequency part, wherein each energy ratio is associated with a respective direction parameter value; decoding the at least one energy ratio for the time-frequency part; generating respective at least one modified energy ratio from the at least one energy ratio for the time-frequency part; determining a quantization spatial resolution for decoding the at least one obtained direction parameter value based on the at least one modified energy ratio; and decoding the obtained direction parameter values based on the quantization spatial resolution.

The at least one energy ratio for the time-frequency part may comprise at least two direct-to-total energy ratios and a diffuse-to-total energy ratio for the time-frequency part and generating respective at least one modified energy ratio from the at least one energy ratio for the time-frequency part may comprise: determining a largest at the at least two direct-to-total energy ratios; modifying the largest of the at least two direct-to-total energy ratios to be an additive inverse of the diffuse-to-total energy ratio; and modifying others of the at least two direct-to-total energy ratios to be divided by the largest of the at least two direct-to-total energy ratios and multiplied by the additive inverse of the diffuse-to-total energy ratio.

The at least one energy ratio for the time-frequency part may comprise at least two direct-to-total energy ratios and generating respective at least one modified energy ratio from the at least one energy ratio for the time-frequency part may comprise: generating a combined ratio value from the at least two direct-to-total energy ratios, and switching the combined ratio value for the largest at the at least two direct-to-total energy ratios; modifying each of others of the at least two direct-to-total energy ratios as the direct-to-total energy ratio divided by the largest of the at least two direct-to-total energy ratios and multiplied by the combined energy ratio.

Generating respective at least one modified energy ratio from the at least one energy ratio for the time-frequency part may comprise generating a modified direct-to-total energy ratio for each of the direct-to-total energy ratios based on a difference for each of the direct-to-total energy ratios and the respective modified direct-to-total energy ratios.

The at least one energy ratio may be a quantized energy ratio.

According to a fifth aspect there is provided an apparatus comprising at least one processor and at least one memory including a computer program code, the at least one memory and the computer program code configured to, with the at least one processor, cause the apparatus at least to: obtain at least one direction parameter value for a time-frequency part of at least one audio signal; obtain at least one energy ratio for the time-frequency part, wherein each energy ratio is associated with a respective direction parameter value; generate respective at least one modified energy ratio from the at least one energy ratio for the time-frequency part; determine a quantization spatial resolution for encoding the at least one obtained direction parameter value based on the at least one modified energy ratio; and encode the obtained direction parameter values based on the quantization spatial resolution.

The at least one energy ratio for the time-frequency part may comprise at least two direct-to-total energy ratios and a diffuse-to-total energy ratio for the time-frequency part and the apparatus caused to generate respective at least one modified energy ratio from the at least one energy ratio for the time-frequency part may be caused to: determine a largest at the at least two direct-to-total energy ratios; modify the largest of the at least two direct-to-total energy ratios to be an additive inverse of the diffuse-to-total energy ratio; and modify others of the at least two direct-to-total energy ratios to be divided by the largest of the at least two direct-to-total energy ratios and multiplied by the additive inverse of the diffuse-to-total energy ratio.

The at least one energy ratio for the time-frequency part may comprise at least two direct-to-total energy ratios and apparatus caused to generate respective at least one modified energy ratio from the at least one energy ratio for the time-frequency part may be caused to: generate a combined ratio value from the at least two direct-to-total energy ratios, and switch the combined ratio value for the largest at the at least two direct-to-total energy ratios; and modify each of others of the at least two direct-to-total energy ratios as the direct-to-total energy ratio divided by the largest of the at least two direct-to-total energy ratios and multiplied by the combined energy ratio.

The apparatus caused to generate respective at least one modified energy ratio from the at least one energy ratio for the time-frequency part may be caused to generate a modified direct-to-total energy ratio for each of the direct-to-total energy ratios based on a difference for each of the direct-to-total energy ratios and the respective modified direct-to-total energy ratios.

The at least one energy ratio may be a quantized energy ratio.

The apparatus caused to obtain at least one energy ratio for the time-frequency part, wherein each energy ratio is associated with a respective direction parameter value may be caused to: analyse the at least one audio signal to obtain at least two direct-to-total unquantized energy ratios for the time-frequency part; and quantize the at least two direct-to-total unquantized energy ratios for the time-frequency part to generate at least two direct-to-total quantized energy ratios.

The apparatus caused to quantize the at least two direct-to-total unquantized energy ratios for the time-frequency part to generate at least two direct-to-total quantized energy ratios may be caused to: quantize a first of the at least two direct-to-total unquantized energy ratios for the time-frequency part with a first codebook; quantize a second of the at least two direct-to-total unquantized energy ratios for the time-frequency part with a second codebook, wherein the first codebook and the second codebook are one of: a same resolution such that encoding of the second of the at least two direct-to-total unquantized energy ratios require fewer bits to encode than the first of the at least two direct-to-total unquantized energy ratios; and a different resolution such that encoding of the second of the at least two direct-to-total unquantized energy ratios is encoded with a greater resolution than the first of the at least two direct-to-total unquantized energy ratios.

The apparatus caused to quantize the at least two direct-to-total unquantized energy ratios for the time-frequency part to generate at least two direct-to-total quantized energy ratios may further caused to: quantize a first of the at least two direct-to-total unquantized energy ratios for the time-frequency part with a first codebook; quantize a second of the at least two direct-to-total unquantized energy ratios for the time-frequency part with a second codebook, wherein quantizing the second of the at least two direct-to-total unquantized energy ratios for the time-frequency part a codeword from the second codebook is chosen such that in addition to minimizing the distance to the second of the at least two direct-to-total unquantized energy ratios a ratio between the quantized first of the at least two direct-to-total unquantized energy ratios and quantized second of the at least two direct-to-total unquantized energy ratios is as close as possible to a ratio between the first of the at least two direct-to-total unquantized energy ratios and the second of the at least two direct-to-total unquantized energy ratios.

The apparatus caused to generate respective the at least one modified energy ratio from the at least one energy ratio for the time-frequency part may be caused to constrain the modification of the at least one modified energy ratio based on at least one of: a bit usage for the encoding of the direction parameter values; and an accuracy of the encoding of the direction parameter values.

According to a sixth aspect there is provided an apparatus comprising at least one processor and at least one memory including a computer program code, the at least one memory and the computer program code configured to, with the at least one processor, cause the apparatus at least to: obtain at least one encoded bitstream comprising: at least one direction parameter value for a time-frequency part of at least one audio signal; at least one energy ratio for the time-frequency part, wherein each energy ratio is associated with a respective direction parameter value; decode the at least one energy ratio for the time-frequency part; generate respective at least one modified energy ratio from the at least one energy ratio for the time-frequency part; determine a quantization spatial resolution for decoding the at least one obtained direction parameter value based on the at least one modified energy ratio; and decode the obtained direction parameter values based on the quantization spatial resolution.

The at least one energy ratio for the time-frequency part may comprise at least two direct-to-total energy ratios and a diffuse-to-total energy ratio for the time-frequency part and the apparatus caused to generate respective at least one modified energy ratio from the at least one energy ratio for the time-frequency part may be caused to: determine a largest at the at least two direct-to-total energy ratios; modify the largest of the at least two direct-to-total energy ratios to be an additive inverse of the diffuse-to-total energy ratio; and modify others of the at least two direct-to-total energy ratios to be divided by the largest of the at least two direct-to-total energy ratios and multiplied by the additive inverse of the diffuse-to-total energy ratio.

The at least one energy ratio for the time-frequency part may comprise at least two direct-to-total energy ratios and the apparatus caused to generate respective at least one modified energy ratio from the at least one energy ratio for the time-frequency part may be caused to: generate a combined ratio value from the at least two direct-to-total energy ratios, and switch the combined ratio value for the largest at the at least two direct-to-total energy ratios; modify each of others of the at least two direct-to-total energy ratios as the direct-to-total energy ratio divided by the largest of the at least two direct-to-total energy ratios and multiplied by the combined energy ratio.

The apparatus caused to generate respective at least one modified energy ratio from the at least one energy ratio for the time-frequency part may be caused to generate a modified direct-to-total energy ratio for each of the direct-to-total energy ratios based on a difference for each of the direct-to-total energy ratios and the respective modified direct-to-total energy ratios.

The at least one energy ratio may be a quantized energy ratio.

According to a seventh aspect there is provided an apparatus comprising: means for obtaining at least one direction parameter value for a time-frequency part of at least one audio signal; means for obtaining at least one energy ratio for the time-frequency part, wherein each energy ratio is associated with a respective direction parameter value; means for generating respective at least one modified energy ratio from the at least one energy ratio for the time-frequency part; means for determining a quantization spatial resolution for encoding the at least one obtained direction parameter value based on the at least one modified energy ratio; and means for encoding the obtained direction parameter values based on the quantization spatial resolution.

According to an eighth aspect there is provided an apparatus comprising: means for obtaining at least one encoded bitstream comprising: at least one direction parameter value for a time-frequency part of at least one audio signal; at least one energy ratio for the time-frequency part, wherein each energy ratio is associated with a respective direction parameter value; means for decoding the at least one energy ratio for the time-frequency part; means for generating respective at least one modified energy ratio from the at least one energy ratio for the time-frequency part; means for determining a quantization spatial resolution for decoding the at least one obtained direction parameter value based on the at least one modified energy ratio; and means for decoding the obtained direction parameter values based on the quantization spatial resolution.

According to a ninth aspect there is provided a computer program comprising instructions [or a computer readable medium comprising program instructions] for causing an apparatus to perform at least the following: obtain at least one direction parameter value for a time-frequency part of at least one audio signal; obtain at least one energy ratio for the time-frequency part, wherein each energy ratio is associated with a respective direction parameter value; generate respective at least one modified energy ratio from the at least one energy ratio for the time-frequency part; determine a quantization spatial resolution for encoding the at least one obtained direction parameter value based on the at least one modified energy ratio; and encode the obtained direction parameter values based on the quantization spatial resolution.

According to a tenth aspect there is provided a computer program comprising instructions [or a computer readable medium comprising program instructions] for causing an apparatus to perform at least the following: obtain at least one encoded bitstream comprising: at least one direction parameter value for a time-frequency part of at least one audio signal; at least one energy ratio for the time-frequency part, wherein each energy ratio is associated with a respective direction parameter value; decode the at least one energy ratio for the time-frequency part; generate respective at least one modified energy ratio from the at least one energy ratio for the time-frequency part; determine a quantization spatial resolution for decoding the at least one obtained direction parameter value based on the at least one modified energy ratio; and decode the obtained direction parameter values based on the quantization spatial resolution.

According to an eleventh aspect there is provided a non-transitory computer readable medium comprising program instructions for causing an apparatus to perform at least the following: obtain at least one direction parameter value for a time-frequency part of at least one audio signal; obtain at least one energy ratio for the time-frequency part, wherein each energy ratio is associated with a respective direction parameter value; generate respective at least one modified energy ratio from the at least one energy ratio for the time-frequency part; determine a quantization spatial resolution for encoding the at least one obtained direction parameter value based on the at least one modified energy ratio; and encode the obtained direction parameter values based on the quantization spatial resolution.

According to a twelfth aspect there is provided a non-transitory computer readable medium comprising program instructions for causing an apparatus to perform at least the following: obtain at least one encoded bitstream comprising: at least one direction parameter value for a time-frequency part of at least one audio signal; at least one energy ratio for the time-frequency part, wherein each energy ratio is associated with a respective direction parameter value; decode the at least one energy ratio for the time-frequency part; generate respective at least one modified energy ratio from the at least one energy ratio for the time-frequency part; determine a quantization spatial resolution for decoding the at least one obtained direction parameter value based on the at least one modified energy ratio; and decode the obtained direction parameter values based on the quantization spatial resolution.

According to a thirteenth aspect there is provided an apparatus comprising: obtaining circuitry configured to obtain at least one direction parameter value for a time-frequency part of at least one audio signal; obtaining circuitry configured to obtain at least one energy ratio for the time-frequency part, wherein each energy ratio is associated with a respective direction parameter value; generating circuitry configured to generate respective at least one modified energy ratio from the at least one energy ratio for the time-frequency part; determining circuitry configured to determine a quantization spatial resolution for encoding the at least one obtained direction parameter value based on the at least one modified energy ratio; and encoding circuitry configured to encode the obtained direction parameter values based on the quantization spatial resolution.

According to a fourteenth aspect there is provided an apparatus comprising: obtaining circuitry obtain at least one encoded bitstream comprising: at least one direction parameter value for a time-frequency part of at least one audio signal; at least one energy ratio for the time-frequency part, wherein each energy ratio is associated with a respective direction parameter value; decoding circuitry configured to decode the at least one energy ratio for the time-frequency part; generating circuitry configured to generate respective at least one modified energy ratio from the at least one energy ratio for the time-frequency part; determining circuitry configured to determine a quantization spatial resolution for decoding the at least one obtained direction parameter value based on the at least one modified energy ratio; and decoding circuitry configured to decode the obtained direction parameter values based on the quantization spatial resolution.

According to a fifteenth aspect there is provided a computer readable medium comprising program instructions for causing an apparatus to perform at least the following: obtain at least one direction parameter value for a time-frequency part of at least one audio signal; obtain at least one energy ratio for the time-frequency part, wherein each energy ratio is associated with a respective direction parameter value; generate respective at least one modified energy ratio from the at least one energy ratio for the time-frequency part; determine a quantization spatial resolution for encoding the at least one obtained direction parameter value based on the at least one modified energy ratio; and encode the obtained direction parameter values based on the quantization spatial resolution According to a sixteenth aspect there is provided a computer readable medium comprising program instructions for causing an apparatus to perform at least the following: obtain at least one encoded bitstream comprising: at least one direction parameter value for a time-frequency part of at least one audio signal; at least one energy ratio for the time-frequency part, wherein each energy ratio is associated with a respective direction parameter value; decode the at least one energy ratio for the time-frequency part; generate respective at least one modified energy ratio from the at least one energy ratio for the time-frequency part; determine a quantization spatial resolution for decoding the at least one obtained direction parameter value based on the at least one modified energy ratio; and decode the obtained direction parameter values based on the quantization spatial resolution.

An apparatus comprising means for performing the actions of the method as described above.

An apparatus configured to perform the actions of the method as described above.

A computer program comprising program instructions for causing a computer to perform the method as described above.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which.

EMBODIMENTS OF THE APPLICATION

Figure 1:
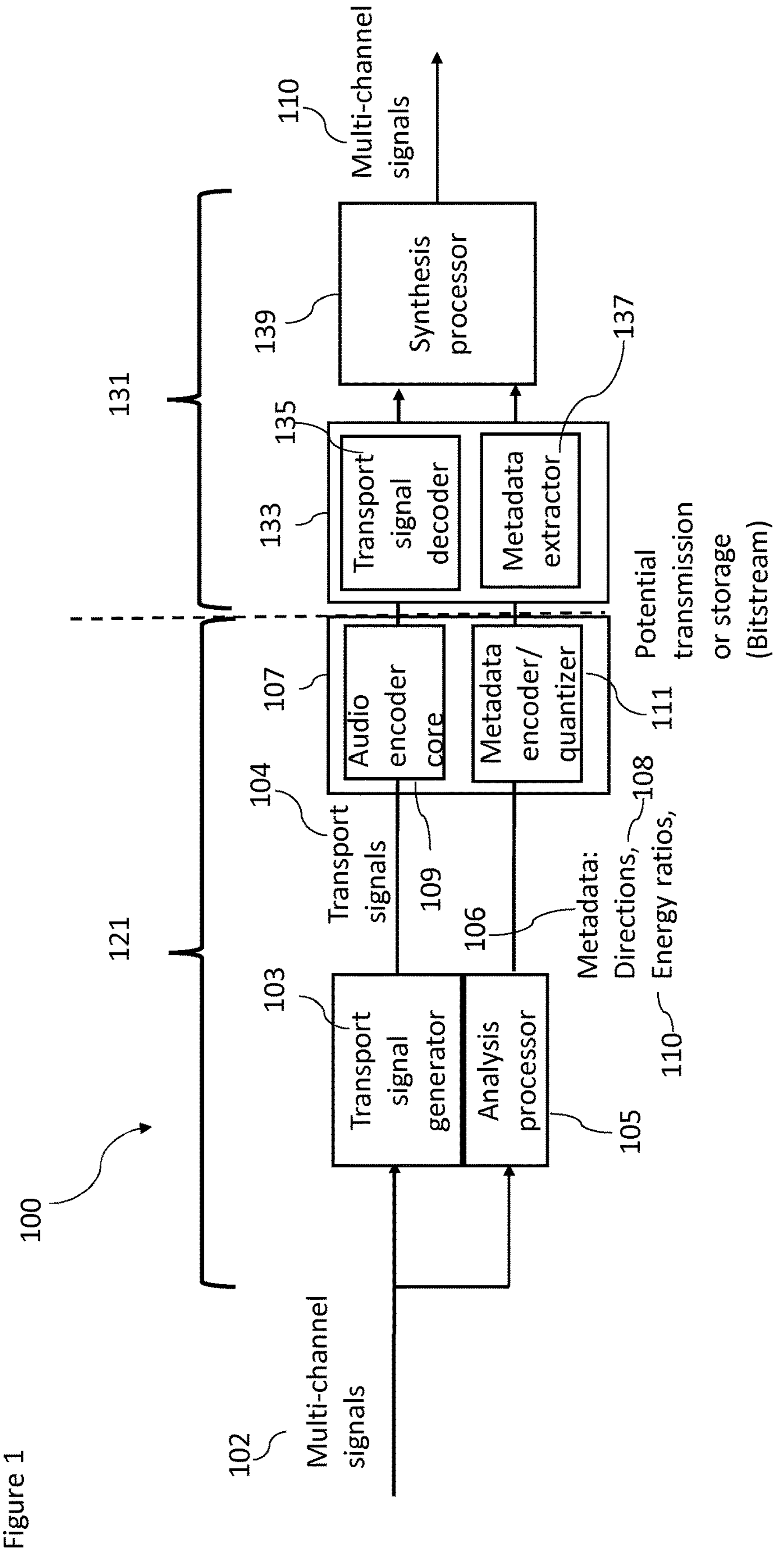
FIG. 1 shows schematically a system of apparatus suitable for implementing some embodiments.

The following describes in further detail suitable apparatus and possible mechanisms for the encoding of parametric spatial audio streams with transport audio signals and spatial metadata. In the embodiments as described herein the existing quantization of multiple spatial directions is modified based on all direct-to-total ratios and the diffuse-to-total ratio and creating from them modified energy ratios for defining the spatial direction quantization accuracy. In the following discussions a multi-channel system is discussed with respect to a multi-channel microphone implementation. However as discussed above the input format may be any suitable input format, such as multi-channel loudspeaker, Ambisonics (FOA/HOA) etc. It is understood that in some embodiments the channel location is based on a location of the microphone or is a virtual location or direction.

Furthermore in the following examples the output of the example system is a multi-channel loudspeaker arrangement. In other embodiments the output may be rendered to the user via means other than loudspeakers. The multi-channel loudspeaker signals may be also generalised to be two or more playback audio signals.

As discussed above directional metadata associated with the audio signals may comprise multiple parameters (such as multiple directions and associated with each direction a direct-to-total ratio, distance, etc.) per time-frequency tile. The directional metadata may also comprise other parameters or may be associated with other parameters which are considered to be non-directional (such as surround coherence, diffuse-to-total energy ratio, remainder-to-total energy ratio) but when combined with the directional parameters are able to be used to define the characteristics of the audio scene. For example a reasonable design choice which is able to produce a good quality output is one where the directional metadata comprises two directions for each time-frequency subframe (and associated with each direction direct-to-total ratios, distance values etc) are determined. However as also discussed above, bandwidth and/or storage limitations may require a codec not to send directional metadata parameter values for each frequency band and temporal sub-frame.

As described above, parametric spatial metadata representation can use multiple concurrent spatial directions. With MASA, the proposed number of concurrent directions is two. For each concurrent direction, there may be four parameters: Direction index; Direct-to-total ratio; Spread coherence and Distance.

Direct-to-total ratios describe how much of energy comes from specific directions whereas diffuse-to-total ratio describes how much of the energy does not come from any specific direction. These sum to one (if there is no remainder energy present).

As these energy ratios directly describe how significant contribution different directions have to total sound energy and thus, how perceptible they are, they can be used to control the quantization of spatial directions. There are examples where the quantization resolution of the spatial directions is reduced when the direct-to-total ratio becomes lower. Alternatively, a diffuse-to-total ratio value may be used (as it is 1-direct-to-total for one direction) and when the diffuse-to-total ratio value increases, the resolution of the spatial direction may be reduced. This may be practically implemented with lookup tables for bit budget and corresponding codebooks.

However, when multiple concurrent directions are present, this existing approach does not produce optimal results. If direct-to-total ratios are used independently to control quantization of their corresponding spatial direction without any modifications, then there is an overall reduction of accuracy for the directions as the codebooks are tuned for one direction direct-to-total ratio values. This especially affects sound scenes with two equally important strong sources as their total ratio sum is always at one. For example, this could mean that both get the direction quantization codebook intended for a 0.5 ratio which is significantly less accurate.

On the other hand, using the diffuse-to-total ratio can achieve good accuracy for both directions but contains no information of the relation between the two direct-to-total ratios. This means that bits can be wasted when one direct-to-total ratio is significantly smaller (and less audible) than the other.

Furthermore when there is a single direction (joined with methods in GB patent application 1919131.1) bands and two-direction bands present in same metadata. Single direction bands tend to have higher directional accuracy and actually may even use more bits to send the single direction than the total bits of two directions.

The embodiments as discussed herein thus are configured to implement existing spatial direction quantization methods but can be configured to determine when there is more than one direction present and modify the processing when there is more than one direction present (in some embodiments there is no detection or determination of more than one direction and the operations are carried out on the information). In these embodiments the accuracy of spatial direction quantization is scaled such that following conditions happen:

high diffuse-to-total ratio $r_{diff}$ results in lower maximum (and overall) spatial direction accuracy low diffuse-to-total ratio $r_{diff}$ results in higher maximum (and overall) spatial direction accuracy low relative direct-to-total ratio $r_{dir1}$ results in lower spatial direction accuracy compared to the higher direct-to-total ratio $r_{dir2}$ direction direct-to-total ratios with equal values ($r_{dir1}=r_{dir2}$) may obtain highest possible accuracy In addition, in some embodiments a suitable quantization system may be used for quantization of two directions where spatial direction accuracy has been optimized well for quantization of single direction.

With respect to FIG. 1 an example apparatus and system for implementing embodiments of the application are shown. The system 100 is shown with an 'analysis' part 121 and a 'synthesis' part 131. The 'analysis' part 121 is the part from receiving the multi-channel signals up to an encoding of the directional metadata and transport signal and the 'synthesis' part 131 is the part from a decoding of the encoded directional metadata and transport signal to the presentation of the re-generated signal (for example in multi-channel loudspeaker form).

In the following description the 'analysis' part 121 is described as a series of parts however in some embodiments the part may be implemented as functions within the same functional apparatus or part. In other words in some embodiments the 'analysis' part 121 is an encoder comprising at least one of the transport signal generator or analysis processor as described hereafter.

The input to the system 100 and the 'analysis' part 121 is the multi-channel signals 102. The 'analysis' part 121 may comprise a transport signal generator 103, analysis processor 105, and encoder 107. In the following examples a microphone channel signal input is described, however any suitable input (or synthetic multi-channel) format may be implemented in other embodiments. In such embodiments the directional metadata associated with the audio signals may be a provided to an encoder as a separate bit-stream. The multi-channel signals are passed to a transport signal generator 103 and to an analysis processor 105.

In some embodiments the transport signal generator 103 is configured to receive the multi-channel signals and generate a suitable audio signal format for encoding. The transport signal generator 103 can for example generate a stereo or mono audio signal. The transport audio signals generated by the transport signal generator can be any known format. For example when the input is one where the audio signals input are mobile phone microphone array audio signals, the transport signal generator 103 can be configured to select a left-right microphone pair, and apply any suitable processing to the audio signal pair, such as automatic gain control, microphone noise removal, wind noise removal, and equalization. In some embodiments when the input is a first order Ambisonic/higher order Ambisonic (FOA/HOA) signal, the transport signal generator can be configured to formulate directional beam signals towards left and right directions, such as two opposing cardioid signals. Additionally in some embodiments when the input is a loudspeaker surround mix and/or objects, then the transport signal generator 103 can be configured to generate a downmix signal that combines left side channels to a left downmix channel, combined right side channels to a right downmix channel and adds centre channels to both transport channels with a suitable gain.

In some embodiments the transport signal generator is bypassed (or in other words is optional). For example, in some situations where the analysis and synthesis occur at the same device at a single processing step, without intermediate processing there is no transport signal generation and the input audio signals are passed unprocessed. The number of transport channels generated can be any suitable number and not for example one or two channels.

The output of the transport signal generator 103 can be passed to an encoder 107.

In some embodiments the analysis processor 105 is also configured to receive the multi-channel signals and analyse the signals to produce directional metadata 106 associated with the multi-channel signals and thus associated with the transport signals 104.

The analysis processor 105 may be configured to generate the directional metadata parameters which may comprise, for each time-frequency analysis interval, at least one direction parameter 108 and at least one energy ratio parameter 110 (and in some embodiments other parameters, of which a non-exhaustive list includes number of directions, surround coherence, diffuse-to-total energy ratio, remainder-to-total energy ratio, a spread coherence parameter, and distance parameter). The direction parameter may be represented in any suitable manner, for example as spherical co-ordinates denoted as azimuth $\varphi(k,n)$ and elevation $\theta(k,n)$.

In some embodiments the number of the directional metadata parameters may differ from time-frequency tile to time-frequency tile. Thus for example in band X all of the directional metadata parameters are obtained (generated) and transmitted, whereas in band Y only one of the directional metadata parameters is obtained and transmitted, and furthermore in band Z no parameters are obtained or transmitted. A practical example of this may be that for some time-frequency tiles corresponding to the highest frequency band some of the directional metadata parameters are not required for perceptual reasons. The directional metadata 106 may be passed to an encoder 107.

In some embodiments the analysis processor 105 is configured to apply a time-frequency transform for the input signals. Then, for example, in time-frequency tiles when the input is a mobile phone microphone array, the analysis processor could be configured to estimate delay-values between microphone pairs that maximize the inter-microphone correlation. Then based on these delay values the analysis processor may be configured to formulate a corresponding direction value for the directional metadata. Furthermore the analysis processor may be configured to formulate a direct-to-total ratio parameter based on the correlation value.

In some embodiments, for example where the input is a FOA signal, the analysis processor 105 can be configured to determine an intensity vector. The analysis processor may then be configured to determine a direction parameter value for the directional metadata based on the intensity vector. A diffuse-to-total ratio can then be determined, from which a direct-to-total ratio parameter value for the directional metadata can be determined. This analysis method is known in the literature as Directional Audio Coding (DirAC).

In some examples, for example where the input is a HOA signal, the analysis processor 105 can be configured to divide the HOA signal into multiple sectors, in each of which the method above is utilized. This sector-based method is known in the literature as higher order DirAC (HO-DirAC). In these examples, there is more than one simultaneous direction parameter value per time-frequency tile corresponding to the multiple sectors.

Additionally in some embodiments where the input is a loudspeaker surround mix and/or audio object(s) based signal, the analysis processor can be configured to convert the signal into a FOA/HOA signal(s) format and to obtain direction and direct-to-total ratio parameter values as above.

The encoder 107 may comprise an audio encoder core 109 which is configured to receive the transport audio signals 104 and generate a suitable encoding of these audio signals. The encoder 107 can in some embodiments be a computer (running suitable software stored on memory and on at least one processor), or alternatively a specific device utilizing, for example, FPGAs or ASICs. The audio encoding may be implemented using any suitable scheme.

The encoder 107 may furthermore comprise a directional metadata encoder/quantizer 111 which is configured to receive the directional metadata and output an encoded or compressed form of the information. In some embodiments the encoder 107 may further interleave, multiplex to a single data stream or embed the directional metadata within encoded downmix signals before transmission or storage shown in FIG. 1 by the dashed line. The multiplexing may be implemented using any suitable scheme.

In some embodiments the transport signal generator 103 and/or analysis processor 105 may be located on a separate device (or otherwise separate) from the encoder 107. For example in such embodiments the directional metadata (and associated non-directional metadata) parameters associated with the audio signals may be a provided to the encoder as a separate bit-stream.

In some embodiments the transport signal generator 103 and/or analysis processor 105 may be part of the encoder 107, i.e., located inside of the encoder and be on a same device.

In the following description the 'synthesis' part 131 is described as a series of parts however in some embodiments the part may be implemented as functions within the same functional apparatus or part.

In the decoder side, the received or retrieved data (stream) may be received by a decoder/demultiplexer 133. The decoder/demultiplexer 133 may demultiplex the encoded streams and pass the audio encoded stream to a transport signal decoder 135 which is configured to decode the audio signals to obtain the transport audio signals. Similarly the decoder/demultiplexer 133 may comprise a metadata extractor 137 which is configured to receive the encoded directional metadata (for example a direction index representing a direction parameter value) and generate directional metadata.

The decoder/demultiplexer 133 can in some embodiments be a computer (running suitable software stored on memory and on at least one processor), or alternatively a specific device utilizing, for example, FPGAs or ASICs.

The decoded metadata and transport audio signals may be passed to a synthesis processor 139.

The system 100 'synthesis' part 131 further shows a synthesis processor 139 configured to receive the transport audio signal and the directional metadata and re-creates in any suitable format a synthesized spatial audio in the form of multi-channel signals 110 (these may be multichannel loudspeaker format or in some embodiments any suitable output format such as binaural or Ambisonics signals, depending on the use case) based on the transport signals and the directional metadata.

The synthesis processor 139 thus creates the output audio signals, e.g., multichannel loudspeaker signals or binaural signals based on any suitable known method. This is not explained here in further detail. However, as a simplified example, the rendering can be performed for loudspeaker output according to any of the following methods. For example the transport audio signals can be divided to direct and ambient streams based on the direct-to-total and diffuse-to-total energy ratios. The direct stream can then be rendered based on the direction parameter(s) using amplitude panning. The ambient stream can furthermore be rendered using decorrelation. The direct and the ambient streams can then be combined.

The output signals can be reproduced using a multichannel loudspeaker setup or headphones which may be head-tracked.

It should be noted that the processing blocks of FIG. 1 can be located in same or different processing entities. For example, in some embodiments, microphone signals from a mobile device are processed with a spatial audio capture system (containing the analysis processor and the transport signal generator), and the resulting spatial metadata and transport audio signals (e.g., in the form of a MASA stream) are forwarded to an encoder (e.g., an IVAS encoder), which contains the encoder. In other embodiments, input signals (e.g., 5.1 channel audio signals) are directly forwarded to an encoder (e.g., an IVAS encoder), which contains the analysis processor, the transport signal generator, and the encoder.

In some embodiments there can be two (or more) input audio signals, where the first audio signal is processed by the apparatus shown in FIG. 1 (resulting in data as an input for the encoder) and the second audio signal is directly forwarded to an encoder (e.g., an IVAS encoder), which contains the analysis processor, the transport signal generator, and the encoder. The audio input signals may then be encoded in the encoder independently or they may, e.g., be combined in the parametric domain according to what may be called, e.g., MASA mixing.

In some embodiments there may be a synthesis part which comprises separate decoder and synthesis processor entities or apparatus, or the synthesis part can comprise a single entity which comprises both the decoder and the synthesis processor. In some embodiments, the decoder block may process in parallel more than one incoming data stream. In the application the term synthesis processor may be interpreted as an internal or external renderer.

Therefore in summary first the system (analysis part) is configured to receive multi-channel audio signals. Then the system (analysis part) is configured to generate a suitable transport audio signal (for example by selecting some of the audio signal channels). The system is then configured to encode for storage/transmission the transport audio signal. After this the system may store/transmit the encoded transport audio signal and metadata. The system may retrieve/receive the encoded transport audio signal and metadata. Then the system is configured to extract the transport audio signal and metadata from encoded transport audio signal and metadata parameters, for example demultiplex and decode the encoded transport audio signal and metadata parameters.

The system (synthesis part) is configured to synthesize an output multi-channel audio signal based on extracted transport audio signal and metadata.

Figure 2:
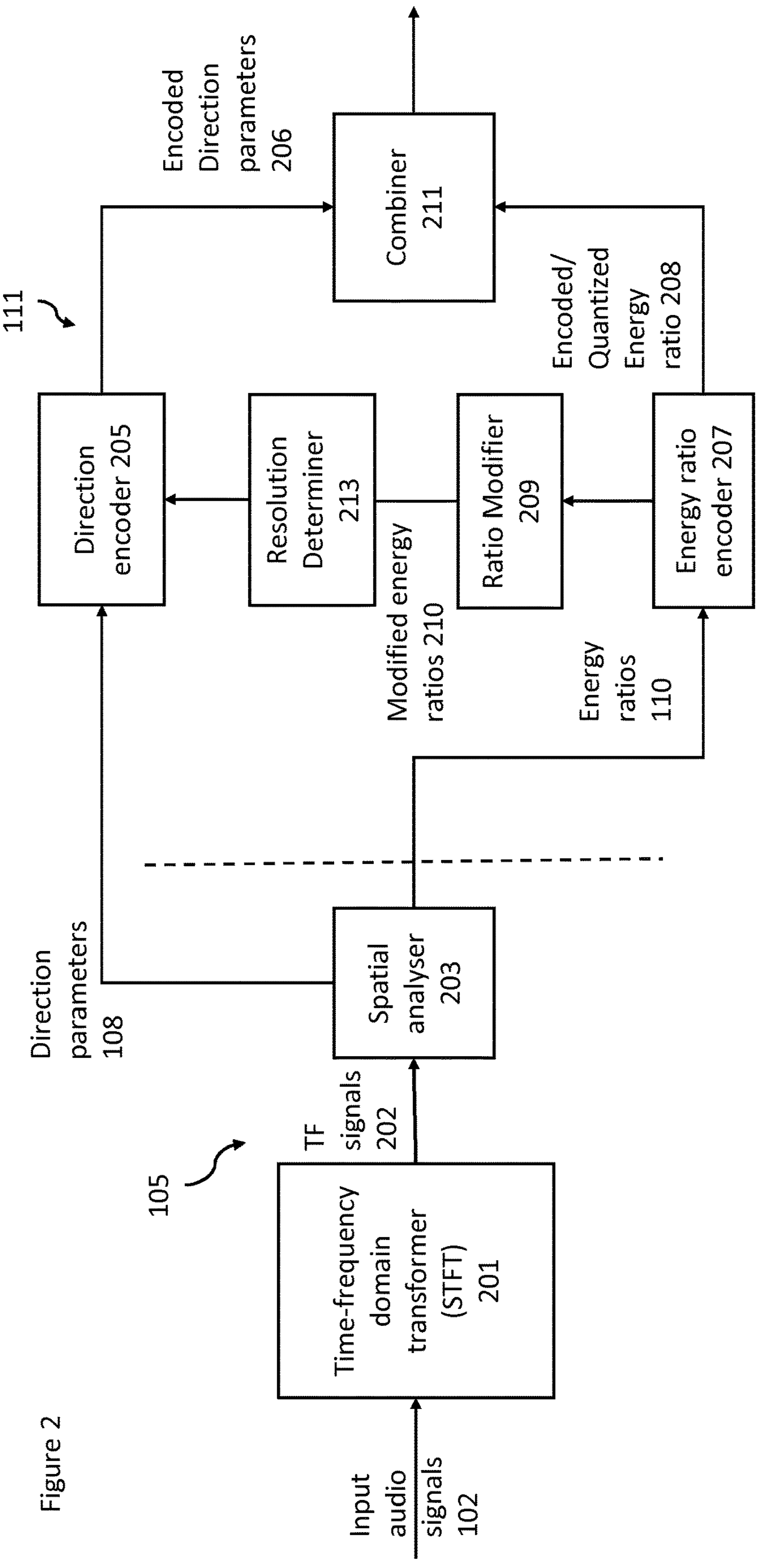
FIG. 2 shows schematically the metadata encoder according to some embodiments.

With respect to FIG. 2 an example analysis processor 105 and Metadata encoder/quantizer 111 (as shown in FIG. 1) according to some embodiments is described in further detail.

The analysis processor 105 in some embodiments comprises a time-frequency domain transformer 201.

In some embodiments the time-frequency domain transformer 201 is configured to receive the multi-channel signals 102 and apply a suitable time to frequency domain transform such as a Short Time Fourier Transform (STFT) in order to convert the input time domain signals into a suitable time-frequency signals. These time-frequency signals may be passed to a spatial analyser 203.

Thus for example the time-frequency signals 202 may be represented in the time-frequency domain representation by $$s_i(b,n),$$

where b is the frequency bin index and n is the time-frequency block (frame) index and i is the channel index. In another expression, n can be considered as a time index with a lower sampling rate than that of the original time-domain signals. These frequency bins can be grouped into subbands that group one or more of the bins into a subband of a band index k=0, . . . , K−1. Each subband k has a lowest bin $b_{k,low}$ and a highest bin $b_{k,high}$, and the subband contains all bins from $b_{k,low}$ to $b_{k,high}$. The widths of the subbands can approximate any suitable distribution. For example the Equivalent rectangular bandwidth (ERB) scale or the Bark scale.

In some embodiments the analysis processor 105 comprises a spatial analyser 203. The spatial analyser 203 may be configured to receive the time-frequency signals 202 and based on these signals estimate one or more direction parameters 108. The direction parameters may be determined based on any audio based 'direction' determination.

For example in some embodiments the spatial analyser 203 is configured to estimate the direction with two or more signal inputs. This represents the simplest configuration to estimate a 'direction', more complex processing may be performed with even more signals.

The spatial analyser 203 may thus be configured to identify at least one 'direction', dir, of audio arrival for each frequency band and based on this direction provide at least one azimuth and elevation for each frequency band and temporal time-frequency block within a frame of an audio signal. These may be denoted as Q directions where $Dir_{1..Q}$ Azimuth $\varphi_{1 \ldots Q}(k,n)$ and elevation $\theta_{1 \ldots Q}(k,n)$. The direction parameters 108 may be also be passed to a direction encoder (index generator) 205.

The spatial analyser 203 may also be configured to determine one or more energy ratio parameters 110. The energy ratio may be considered to be a determination of the energy of the audio signal which can be considered to arrive from the identified 'direction'. The direct-to-total energy ratio $r_{1 \ldots Q}(k,n)$ can be estimated, e.g., using a stability measure of the directional estimate, or using any correlation measure, or any other suitable method to obtain a ratio parameter. The energy ratio may be passed to an energy ratio encoder 207.

The spatial analyser 203 may furthermore be configured to determine a number of coherence parameters 112 which may include surrounding coherence ($\gamma(k,n)$) and spread coherence ($\zeta(k,n)$), both analysed in time-frequency domain.

Therefore in summary the analysis processor is configured to receive time domain multichannel or other format such as microphone or ambisonic audio signals.

Following this the analysis processor may apply a time domain to frequency domain transform (e.g. STFT) to generate suitable time-frequency domain signals for analysis and then apply direction analysis to determine direction and energy ratio parameters.

The analysis processor may then be configured to output the determined parameters.

Although directions, energy ratios, and coherence parameters are here expressed for each time index n, in some embodiments the parameters may be combined over several time indices. Same applies for the frequency axis, as has been expressed, the direction of several frequency bins b could be expressed by one direction parameter in band k consisting of several frequency bins b. The same applies for all of the discussed spatial parameters herein.

In some embodiments the directional data may be represented using 16 bits such that each azimuth parameter is approximately represented on 9 bits, and the elevation on 7 bits. In such embodiments the energy ratio parameter may be represented on 8 bits. For each frame there may be N subbands (where N may be between 1 and 24 and may be fixed at 5), and M time frequency (TF) blocks (where the value of M may be M=4). Thus in this example there are (16+8)×M×N bits needed to store the uncompressed direction and energy ratio metadata for each frame.

As also shown in FIG. 2 an example metadata encoder/quantizer 111 is shown according to some embodiments.

The metadata encoder/quantizer 111 may comprise an energy ratio encoder 207. The energy ratio encoder 207 is configured to receive the energy ratios and determine a suitable encoding for compressing the energy ratios associated with each direction and for the sub-bands and the time-frequency blocks. For example in some embodiments the energy ratio encoder 207 is configured to use 3 bits to encode each energy ratio parameter value.

Furthermore in some embodiments rather than transmitting or storing all energy ratio values for all TF blocks, only one weighted average value per sub-band is transmitted or stored. The average may be determined by taking into account the total energy of each time block, favouring thus the values of the sub-bands having more energy.

In such embodiments the quantized energy ratio values 208 is the same for all the TF blocks of a given sub-band.

In some embodiments the energy ratio encoder 207 is further configured to pass the quantized (encoded) energy ratio values 208 to a combiner 211.

Furthermore in some embodiments the quantized energy ratio values 208 are passed to a ratio modifier 209.

The metadata encoder/quantizer 111 may comprise a ratio modifier 209. The ratio modifier is configured to receive the quantized energy ratios 208 and modify the energy ratios and passing the modified energy ratio values 210 to a resolution determiner 213. In some embodiments the ratio modifier is bypassed when there is only one direction/energy ratio per sub-band/time-frequency index (in other words there is no processing of the quantized energy ratio and the quantized energy ratio associated with the sole direction (for the sub-band/time-frequency index) is passed to the resolution determiner 213. In some embodiments the default operation is to pass the quantized energy ratios 208 to the resolution determiner 213 and when it is determined that there is more than one direction/energy ratio per sub-band/time-frequency index then pass the quantized energy ratios to the ratio modifier 209.

The metadata encoder/quantizer 111 may comprise a resolution determiner 213. The resolution determiner 213 is configured to receive the modified energy ratios 210 and based on these values determine the quantization resolution to be implemented by the direction encoder 205. The quantization resolution may be any suitable quantization resolution arrangement or configuration such as those described within the patent applications PCT/FI2019/050675, GB1811071.8, and GB1913274.5. In some embodiments the quantization resolution is based on an arrangement of spheres forming a spherical grid arranged in rings on a 'surface' sphere which are defined by a look up table defined by the determined quantization resolution. In other words the spherical grid uses the idea of covering a sphere with smaller spheres and considering the centres of the smaller spheres as points defining a grid of almost equidistant directions. The smaller spheres therefore define cones or solid angles about the centre point which can be indexed according to any suitable indexing algorithm. Although spherical quantization is described here any suitable quantization, linear or non-linear may be used.

The determined quantization resolution information may be passed to the direction encoder 205.

The metadata encoder/quantizer 111 may comprise a direction encoder 205. The direction encoder 205 is configured to receive the direction parameters 108 and the quantization resolution determined from the modified energy ratios 210 (and in some embodiments an expected bit allocation) and from these values generate a suitable encoded output. The encoded direction parameters 206 may then be passed to the combiner 211.

The metadata encoder/quantizer 111 may comprise a combiner 211. The combiner is configured to receive the encoded (or quantized/compressed) directional parameters and encoded energy ratio parameters and combine these to generate a suitable output (for example a metadata bit stream which may be combined with the transport signal or be separately transmitted or stored from the transport signal).

Figure 3:
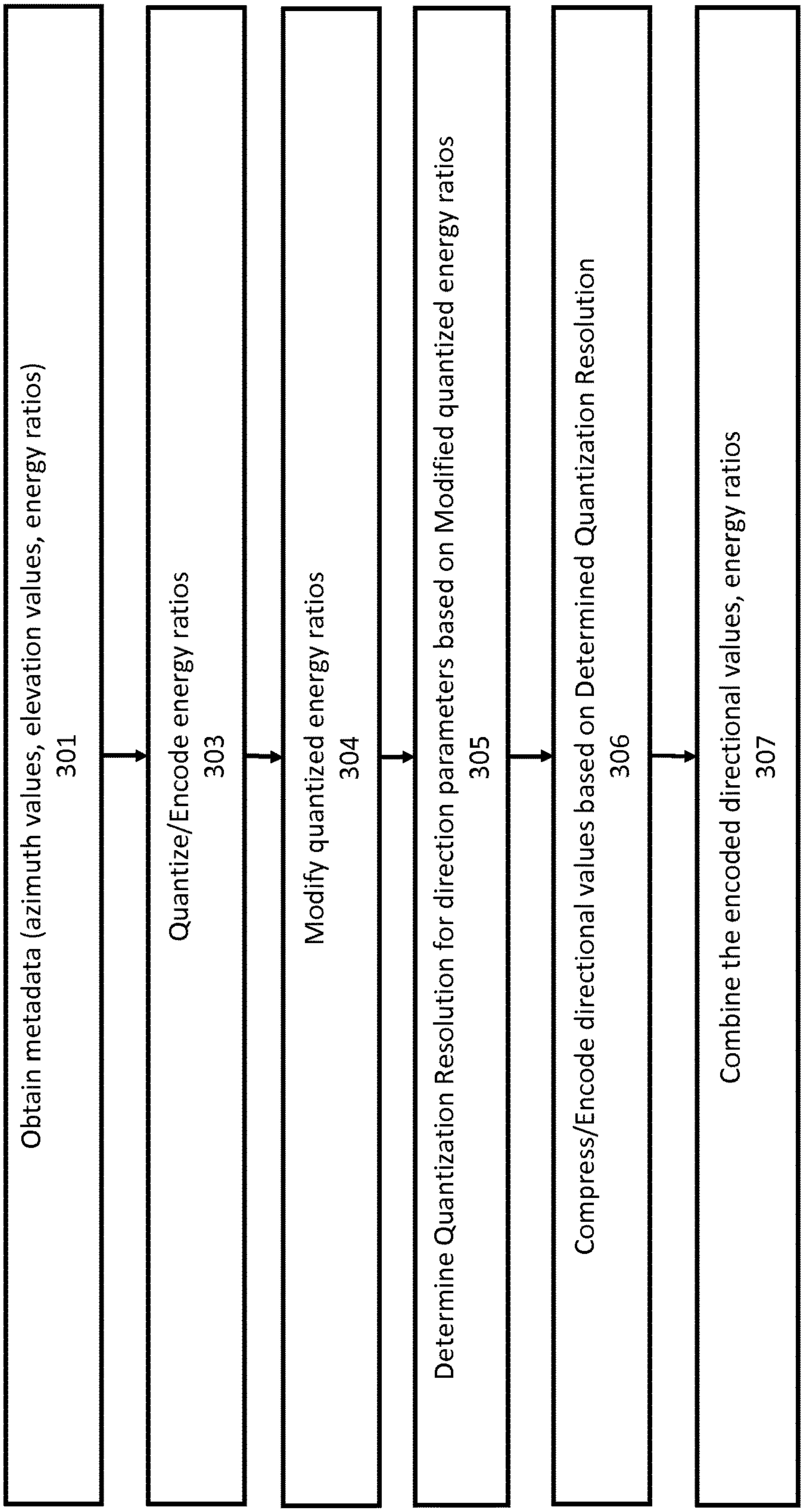
FIG. 3 show a flow diagram of energy ratio encoding and quantization resolution determination operations as shown in FIG. 2 according to some embodiments.

With respect to FIG. 3 is shown an example operation of the metadata encoder/quantizer as shown in FIG. 2 according to some embodiments.

The initial operation is obtaining the metadata (such as azimuth values, elevation values, energy ratios, etc) as shown in FIG. 3 by step 301.

The energy ratios are compressed or encoded (for example by generating a weighted average per sub-band and then quantizing these as a 3 bit value) as shown in FIG. 3 by step 303.

Furthermore the quantized energy ratios are modified as shown in FIG. 3 by step 304.

The modified quantized energy ratios can then be used to determine the quantization resolution for the directional parameters as shown in FIG. 3 by step 305.

The directional values (elevation, azimuth) may then be compressed or encoded (for example by applying a spherical quantization, or any suitable compression) based on the determined quantization resolution as shown in FIG. 3 by step 306.

The encoded directional values, energy ratios (and other parameters such as coherence values) are then combined to generate the encoded metadata as shown in FIG. 3 by step 307.

Figure 4:
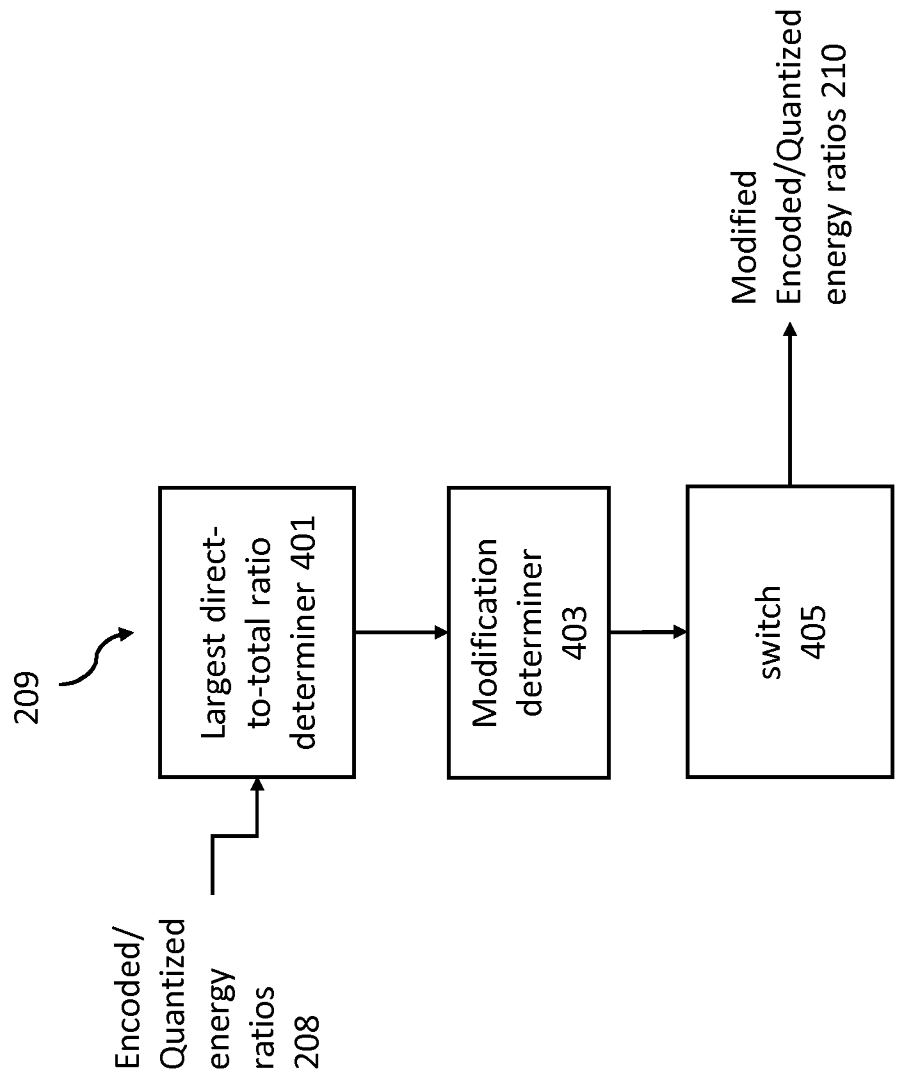
FIG. 4 shows schematically the ratio modifier as shown in FIG. 2 according to some embodiments.

The ratio modifier 209 is shown in further detail with respect to FIG. 4.

In some embodiments the ratio modifier 209 is configured to determine direct-to-total ratios $r_{dir}$ (q) where q signifies the specific direction. For the proposed MASA standards, q may be 1 or 2. Then in some embodiments where diffuse to total ratio $r_{diff}$ has not been previously obtained then the ratio modifier 209 is configured to calculate it using direct-to-total ratios as $$r_{diff}=1-\sum_{q=1}^{Q} r_{dir}(q)$$

where Q is the number of concurrent directions.

In some embodiments the ratio modifier 209 may comprise a largest direct-to-total ratio determiner 401. The largest direct-to-total ratio determiner 401 is configured to find the index of the largest direct-to-total ratio $$q_{rmax} = \underset{q\in[1,Q]}{\operatorname{argmax}}\, r_{dir}(q)$$

The index may then be passed to the modification determiner 403.

The ratio modifier 209 may in some embodiments comprise a modification determiner 403 configured to define that the spatial direction with the largest direct-to-total ratio receives the highest quantization accuracy and is the reference direction. In these embodiments other directions receive less accuracy with relation to the reference direction. Additionally, the highest possible accuracy is defined by the diffuse-to-total ratio such that if it is high, then overall directional accuracy will be low. This can be implemented using the following equations:

$$r_{mod}(q) = \begin{cases} 1 - r_{diff}, & q = q_{rmax} \\ \dfrac{r_{dir}(q)}{r_{dir}(q_{rmax})}(1 - r_{diff}), & q \neq q_{rmax} \end{cases}$$

In other words modify the largest of the at least two direct-to-total energy ratios to be an additive inverse of the diffuse energy ratio and modify others of the at least two direct-to-total energy ratios to be divided by the largest of the at least two direct-to-total energy ratios and multiplied by the additive inverse of the diffuse energy ratio.

In some embodiments modification determiner is configured to pass the calculated $r_{mod}$ values to the switch 405.

In some embodiments the ratio modifier 209 may comprise a switch 405. The switch may be configured to directly substitute the modified $r_{mod}$ values for the original $r_{dir}$ values when selecting the accuracy for spatial direction quantization.

In other words this switching translates to quantizing the modified energy ratios $r_{mod}$ (q) and using the obtained index to select the bit allocation for the elevation and azimuth encoding of the corresponding time-frequency tiles of the current sub-band. The switch 405 can then be configured to output the original and switched (when switched) values.

Alternatively, in some embodiments the modification determiner 403 is configured to determine a difference between the modified quantized energy ratios and the original quantized energy ratios for each direction in the current sub-band. The number of bits allocated for the directional information encoding for each time frequency tile is then increased proportionally to the calculated difference, but not more than the values obtained in the method described above.

Figure 5:
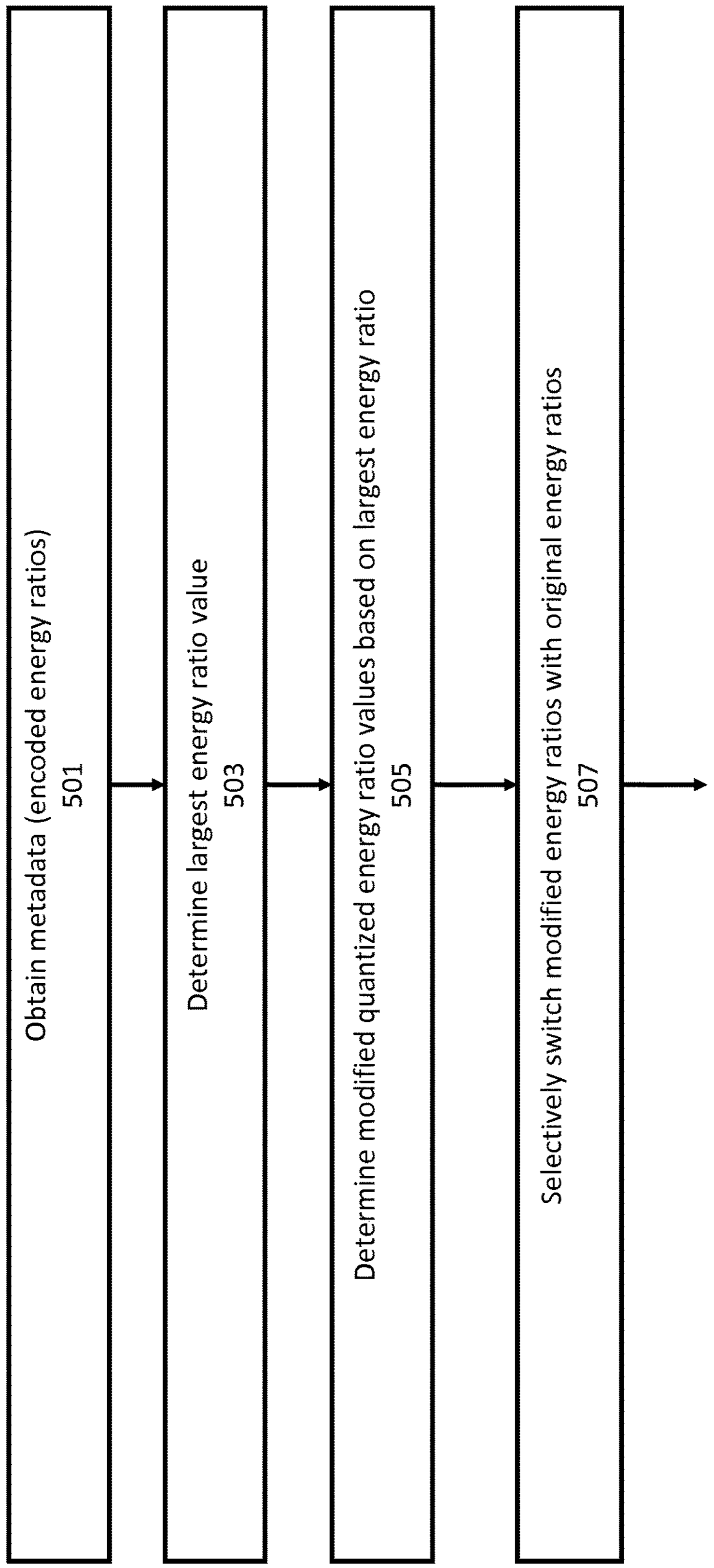
FIG. 5 shows a flow diagram of the operation of the ratio modifier as shown in FIG. 4 according to some embodiments.

With respect to FIG. 5 is shown a flow diagram showing the operations of the ratio modifier 209 as shown in FIG. 4.

The initial operation is obtaining the metadata (such as quantized direct-to-total and quantized diffuse-to-total energy values as shown in FIG. 5 by step 501.

The largest (quantized) energy ratio index is then determined as shown in FIG. 5 by step 503.

The modified quantized energy ratios are then determined as shown in FIG. 5 by step 505.

The selective switching of the modified quantized energy ratios or difference between the modified quantized energy ratios and the original quantized energy ratios is shown in FIG. 5 by step 507.

An example algorithm for the implementation for the obtaining of the the modified quantized direct-to-total ratios is, for example, the following listing.

```
ratioSum = dirRatio1 + dirRatio2;
if (dirRatio1 >= dirRatio2)
{
    dirRatio1mod = ratioSum;
    dirRatio2mod = dirRatio2 / dirRatio1 * ratioSum;
}
else
{
    dirRatio1mod = dirRatio1 / dirRatio2 * ratioSum;
    dirRatio2mod = ratioSum
}
```

Where there are two quantized direct-to-total energy ratios DirRatio1 and DirRatio2 and the corresponding modified quantized direct-to-total energy ratios are dirRatio1mod and dirRatio2mod.

Figure 6:
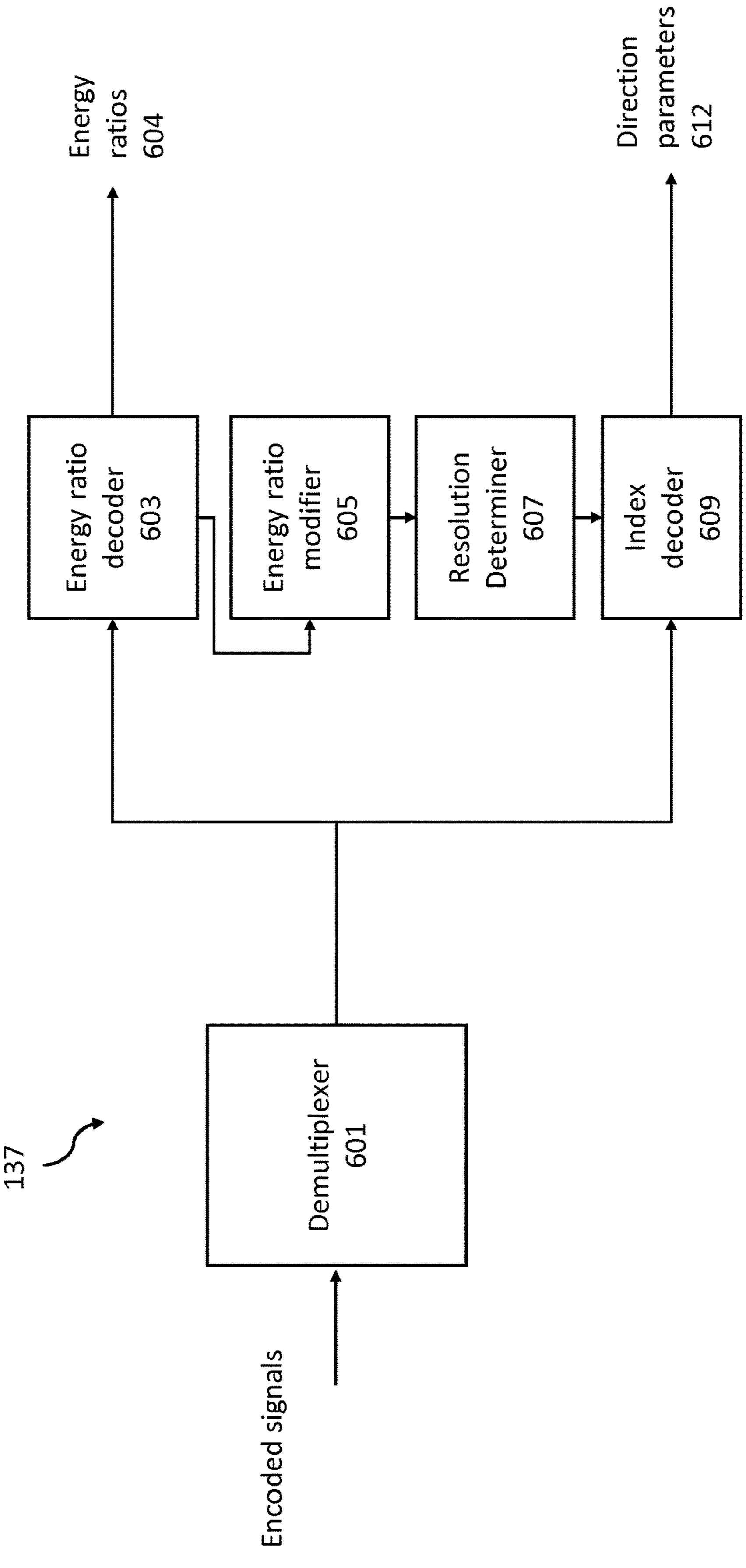
FIG. 6 shows schematically the metadata extractor as shown in FIG. 2 according to some embodiments.

Or even in shorter form this may be implemented as:

ratioSum=dirRatio1+dirRatio2;

ratioMax=max(dirRatio1, dirRatio2);

dirRatio1mod=dirRatio1/ratioMax*ratioSum;

dirRatio2mod=dirRatio2/ratioMax*ratioSum;

With respect to FIG. 6 is shown an example decoder or metadata extractor 137.

The metadata extractor 137 in some embodiments comprises a demultiplexer 601 configured to receive the encoded (multiplexed) signals comprising the encoded metadata and extract from it the energy ratio (index or otherwise encoded) and the direction parameters (index values of otherwise encoded).

The metadata extractor 137 in some embodiments comprises an energy ratio decoder 603 configured to convert the index (or otherwise encoded value) and generate energy ratios 604 based on an inverse process to the energy ratio encoding operations described above.

The metadata extractor 137 in some embodiments comprises an energy ratio modifier 605 configured to receive the decoded (but quantized) energy ratios from the energy ratio decoder 603 and configured to calculate or determine similar modified values of the energy ratios in a manner similar to that described above.

The metadata extractor 137 in some embodiments further comprises a resolution determiner 607 configured to receive the (modified) energy ratios and determine the resolution of the encoding used to encode the direction parameters.

Further the metadata extractor 137 comprises an index decoder 609 configured to receive the direction index (or otherwise encoded values) and perform an inverse operation to the direction encoder as described previously using the spatial resolution as determined by the (modified) energy ratios and output the decoded direction values.

Figure 7:
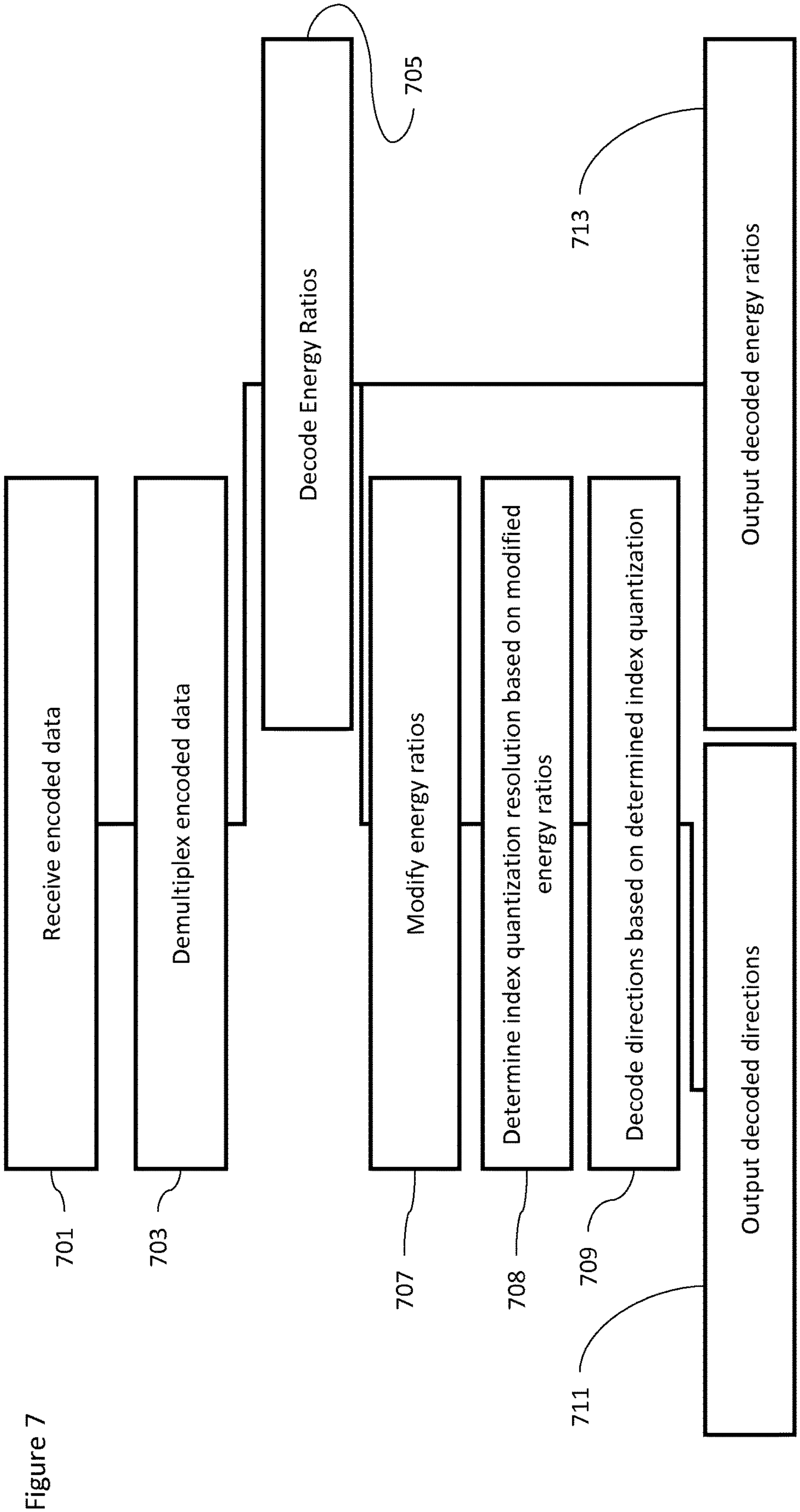
FIG. 7 shows a flow diagram the operation of the metadata extractor as shown in FIG. 6 according to some embodiments.

With respect to FIG. 7 is shown a flow diagram showing the operations of the metadata extractor/decoder as shown in FIG. 6.

Thus the encoded data is received as shown in FIG. 7 by step 701.

The encoded data is demultiplexed as shown in FIG. 7 by step 703.

The energy ratio values from the demultiplex operation can then be decoded as shown in FIG. 7 by step 705.

The decoded energy ratio values can then be output as shown in FIG. 7 by step 713.

Having determined the decoded energy values then the modified energy ratio values can be determined as shown in FIG. 7 by step 707.

The index quantization resolution (the spatial resolution) of the encoded direction parameters is then determined based on the (modified) energy ratio values as shown in FIG. 7 by step 708.

The direction values can then be determined based on the determined index quantization resolution (the spatial resolution) of the encoded direction parameters and the demultiplexed direction index values as shown in FIG. 7 by step 709.

In decoded direction values can then be output as shown in FIG. 7 by step 711.

In some embodiments the encoder may be configured to be able to scale the bitrate usage by adding a scaling factor for both modified ratios or directly selecting, e.g., one step less accurate quantization for all spatial directions.

The examples described above show where the energy ratio values which are modified are the quantized energy ratio values. In some embodiments the non-quantized energy ratio values may be the energy ratios modified and used to determine the directional spatial resolution used to encode the directional parameters.

Although presented here purely in the context of spatial direction quantization, other direction dependent parameters may also use similar strategy as presented here.

In some embodiments there may be constraints on the spectral resolution (or how much the bit usage changes) due to ratio modification. The result of the presented modification may even double the used bits for direction parameter encoding and it may be necessary to limit this to a smaller total bit usage increase. Such limit may be implemented in some embodiments by, for example, constraining the sum of the number of bits for two directions.

In some embodiments the quantization of the energy ratio corresponding to the second or more direction, k, it may be taken into account that the energy ratio cannot be larger than $r_{diff}(k)=1-\Sigma_{q=1}^{k-1}r_{dir}(q)$. This means that the energy ratio of direction k may be configured to use fewer bits, corresponding to the number of energy ratio codewords smaller than r_diff(k), or alternatively it can increase the resolution for quantizing the energy ratio k by using the same number of codewords on a smaller range. The second approach corresponds to remapping the initial energy ratio codebook on the remaining domain. In some embodiments when quantizing the second (smaller) energy ratio the choice of the codeword from an associated codebook can be such that in addition to minimizing the distance to the second energy ratio that the ratio between the quantized first and second energy ratios should be as close as possible to the ratio between the unquantized first and second energy ratios. In other words the aim is to preserve as much as possible the "rapport" between the quantized energy ratios that the unquantized energy ratios have. This is useful as the quantization resolution of the energy ratios is coarse to begin with.

In the examples presented above there are two direction parameter values for each time-frequency part. However it would be understood that in some embodiments there may be any suitable number of direction related parameter values (and associated energy ratios) for each time-frequency part.

Figure 8:
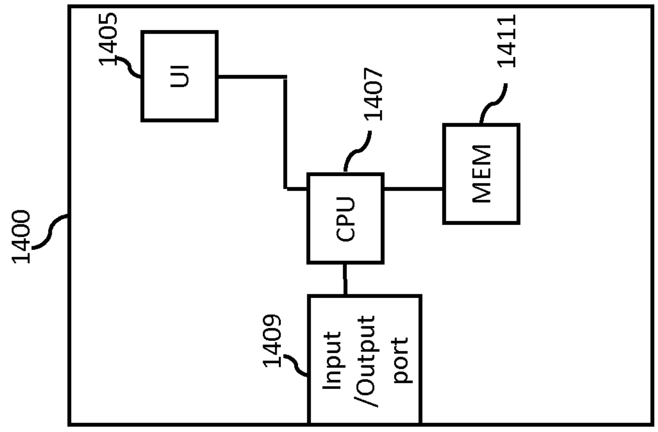
FIG. 8 shows schematically an example device suitable for implementing the apparatus shown.

With respect to FIG. 8 an example electronic device which may be used as the analysis or synthesis device is shown. The device may be any suitable electronics device or apparatus. For example in some embodiments the device 1400 is a mobile device, user equipment, tablet computer, computer, audio playback apparatus, etc.

In some embodiments the device 1400 comprises at least one processor or central processing unit 1407. The processor 1407 can be configured to execute various program codes such as the methods such as described herein.

In some embodiments the device 1400 comprises a memory 1411. In some embodiments the at least one processor 1407 is coupled to the memory 1411. The memory 1411 can be any suitable storage means. In some embodiments the memory 1411 comprises a program code section for storing program codes implementable upon the processor 1407. Furthermore in some embodiments the memory 1411 can further comprise a stored data section for storing data, for example data that has been processed or to be processed in accordance with the embodiments as described herein. The implemented program code stored within the program code section and the data stored within the stored data section can be retrieved by the processor 1407 whenever needed via the memory-processor coupling.

In some embodiments the device 1400 comprises a user interface 1405. The user interface 1405 can be coupled in some embodiments to the processor 1407. In some embodiments the processor 1407 can control the operation of the user interface 1405 and receive inputs from the user interface 1405. In some embodiments the user interface 1405 can enable a user to input commands to the device 1400, for example via a keypad. In some embodiments the user interface 1405 can enable the user to obtain information from the device 1400. For example the user interface 1405 may comprise a display configured to display information from the device 1400 to the user. The user interface 1405 can in some embodiments comprise a touch screen or touch interface capable of both enabling information to be entered to the device 1400 and further displaying information to the user of the device 1400. In some embodiments the user interface 1405 may be the user interface for communicating with the position determiner as described herein.

In some embodiments the device 1400 comprises an input/output port 1409. The input/output port 1409 in some embodiments comprises a transceiver. The transceiver in such embodiments can be coupled to the processor 1407 and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example in some embodiments the transceiver can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

The transceiver input/output port 1409 may be configured to receive the signals and in some embodiments determine the parameters as described herein by using the processor 1407 executing suitable code.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus comprising at least one processor and at least one memory including computer program code, the at least one memory and the computer program code configured to, with the at least one processor, cause the apparatus at least to:

obtain at least two direction parameter values for a time-frequency tile of at least one audio signal;

obtain at least two direct-to-total energy ratios for the time-frequency tile, wherein respective ones of the at least two direct-to-total energy ratios are associated with a respective direction parameter value;

generate a combined ratio value from the at least two direct-to-total energy ratios;

for a largest direct-to-total energy ratio of the at least two direct-to-total energy ratios, generate a first modified energy ratio as the combined ratio value;

for respective ones of the at least two direct-to-total energy ratios other than the largest direct-to-total energy ratio, generate a second modified energy ratio as the direct-to-total energy ratio divided by the largest direct-to-total energy ratio and multiplied by the combined ratio value;

determine a quantization spatial resolution for encoding the at least two direction parameter values based on the first modified energy ratio and the second modified energy ratio generated for respective ones of the at least two direct-to-total energy ratios other than the largest direct-to-total energy ratio; and encode the at least two direction parameter values based on the quantization spatial resolution.

2. The apparatus as claimed in claim 1, wherein respective ones of the at least two direct-to-total energy ratios comprise a quantized direct-to-total energy ratio.

3. The apparatus as claimed in claim 2, wherein the apparatus caused to obtain the at least two direct-to-total energy ratios for the time-frequency tile, wherein respective ones of the at least two direct-to-total energy ratios are associated with a respective direction parameter value, is caused to:

analyze the at least one audio signal to obtain at least two unquantized direct-to-total energy ratios for the time-frequency tile; and quantize the at least two unquantized direct-to-total energy ratios for the time-frequency tile to generate at least two quantized direct-to-total energy ratios.

4. The apparatus as claimed in claim 3, wherein the apparatus caused to quantize the at least two unquantized direct-to-total energy ratios for the time-frequency tile to generate at least two quantized direct-to-total energy ratios is caused to:

quantize a first of the at least two unquantized direct-to-total energy ratios for the time-frequency tile with a first codebook;

quantize a second of the at least two unquantized direct-to-total energy ratios for the time-frequency tile with a second codebook, wherein the first codebook and the second codebook are one of:

a same resolution such that encoding of the second of the at least two unquantized direct-to-total energy ratios requires fewer bits to encode than the first of the at least two unquantized direct-to-total energy ratios; and a different resolution such that encoding of the second of the at least two unquantized direct-to-total energy ratios is encoded with a greater resolution than the first of the at least two unquantized direct-to-total energy ratios.

5. An apparatus comprising at least one processor and at least one memory including computer program code, the at least one memory and the computer program code configured to, with the at least one processor, cause the apparatus at least to:

obtain at least one encoded bitstream comprising:

at least two direction parameter values for a time-frequency tile of at least one audio signal;

at least two direct-to-total energy ratios for the time-frequency tile, wherein respective ones of the at least two direct-to-total energy ratios are associated with a respective direction parameter value;

decode the at least two direct-to-total energy ratios for the time-frequency tile;

generate a combined ratio value from the at least two direct-to-total energy ratios;

for a largest direct-to-total energy ratio of the at least two direct-to-total energy ratios, generate a first modified energy ratio as the combined ratio value;

for respective ones of the at least two direct-to-total energy ratios other than the largest direct-to-total energy ratio, generate a second modified energy ratio as the direct-to-total energy ratio divided by the largest direct-to-total energy ratio and multiplied by the combined ratio value;

determine a quantization spatial resolution for decoding the at least two direction parameter values based on the first modified energy ratio and the second modified energy ratio generated for respective ones of the at least two direct-to-total energy ratios other than the largest direct-to-total energy ratio; and decode the at least two direction parameter values based on the quantization spatial resolution.

6. The apparatus as claimed in claim 5, wherein respective ones of the at least two direct-to-total energy ratios comprise a quantized direct-to-total energy ratio.

7. A method comprising:

obtaining at least two direction parameter values for a time-frequency tile of at least one audio signal;

obtaining at least two direct-to-total energy ratios for the time-frequency tile, wherein respective ones of the at least two direct-to-total energy ratios are associated with a respective direction parameter value;

generating a combined ratio value from the at least two direct-to-total energy ratios;

for a largest direct-to-total energy ratio of the at least two direct-to-total energy ratios, generating a first modified energy ratio as the combined ratio value;

for respective ones of the at least two direct-to-total energy ratios other than the largest direct-to-total energy ratio, generating a second modified energy ratio as the direct-to-total energy ratio divided by the largest direct-to-total energy ratio and multiplied by the combined ratio value;

determining a quantization spatial resolution for encoding the at least two direction parameter values based on the first modified energy ratio and the second modified energy ratio generated for respective ones of the at least two direct-to-total energy ratios other than the largest direct-to-total energy ratio; and encoding the at least two direction parameter values based on the quantization spatial resolution.

8. A method comprising:

obtaining at least one encoded bitstream comprising:

at least two direction parameter values for a time-frequency tile of at least one audio signal;

at least two direct-to-total energy ratio for the time-frequency part, wherein respective ones of the two direct-to-total energy ratios are associated with a respective direction parameter value;

decoding the at least two direct-to-total energy ratios for the time-frequency tile;

generating a combined ratio value from the at least two direct-to-total energy ratios;

for a largest direct-to-total energy ratio of the at least two direct-to-total energy ratios, generating a first modified energy ratio as the combined ratio value;

for respective ones of the at least two direct-to-total energy ratios other than the largest direct-to-total energy ratio, generating a second modified energy ratio as the direct-to-total energy ratio divided by the largest direct-to-total energy ratio and multiplied by the combined ratio value;

determining a quantization spatial resolution for decoding the at least two direction parameter values based on the first modified energy ratio and the second modified energy ratio generated for respective ones of the at least two direct-to-total energy ratios other than the largest direct-to-total energy ratio; and decoding the at least two direction parameter values based on the quantization spatial resolution.

* * * * *